(12) United States Patent
Kim et al.

(10) Patent No.: US 11,477,358 B2
(45) Date of Patent: Oct. 18, 2022

(54) SYSTEM AND METHOD OF MONITORING IN-PEN LIVESTOCK BY USING EDGE INFORMATION ABOUT LIVESTOCK

(71) Applicant: Electronics and Telecommunications Research Institute, Daejeon (KR)

(72) Inventors: You Jin Kim, Daejeon (KR); Se Han Kim, Daejeon (KR); Dae Heon Park, Daejeon (KR); Hyeon Park, Daejeon (KR); Jee Sook Eun, Daejeon (KR); Jae young Jung, Daejeon (KR); Seng Kyoun Jo, Daejeon (KR); Won Kyu Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/402,208

(22) Filed: Aug. 13, 2021

(65) Prior Publication Data
US 2022/0053113 A1    Feb. 17, 2022

(30) Foreign Application Priority Data
Aug. 13, 2020   (KR) ................. 10-2020-0102091

(51) Int. Cl.
*H04N 5/225* (2006.01)
*H04N 5/06* (2006.01)
*A01K 29/00* (2006.01)
*H04N 7/18* (2006.01)
*H04N 5/232* (2006.01)

(52) U.S. Cl.
CPC ......... *H04N 5/2256* (2013.01); *A01K 29/005* (2013.01); *H04N 5/06* (2013.01); *H04N 5/23229* (2013.01); *H04N 7/183* (2013.01)

(58) Field of Classification Search
None
See application file for complete search history.

(56) References Cited

U.S. PATENT DOCUMENTS

| 2012/0087571 | A1 | 4/2012 | Lee et al. |
| 2012/0275659 | A1* | 11/2012 | Gomas ................... G06V 10/76 |
| | | | 382/110 |
| 2014/0210951 | A1 | 7/2014 | Cho |
| 2019/0138801 | A1* | 5/2019 | Psota ....................... G06T 7/73 |
| 2020/0120900 | A1 | 4/2020 | Labrecque et al. |
| 2021/0153479 | A1* | 5/2021 | Mindel .................. G06V 10/56 |

FOREIGN PATENT DOCUMENTS

| KR | 101760020 B1 | 7/2017 |
| KR | 1020170130706 A | 11/2017 |
| KR | 1020200043010 A | 4/2020 |

* cited by examiner

*Primary Examiner* — Eileen M Adams
(74) *Attorney, Agent, or Firm* — William Park & Associates Ltd.

(57) ABSTRACT

A system and method of monitoring in-pen livestock by using edge information about livestock are provided. The method controls a plurality of edge lightings and cameras installed in a pen by using a synchronization signal and accurately acquires and synthesizes edge information about livestock obtained on the basis of a control result to generate monitoring information about livestock.

19 Claims, 6 Drawing Sheets

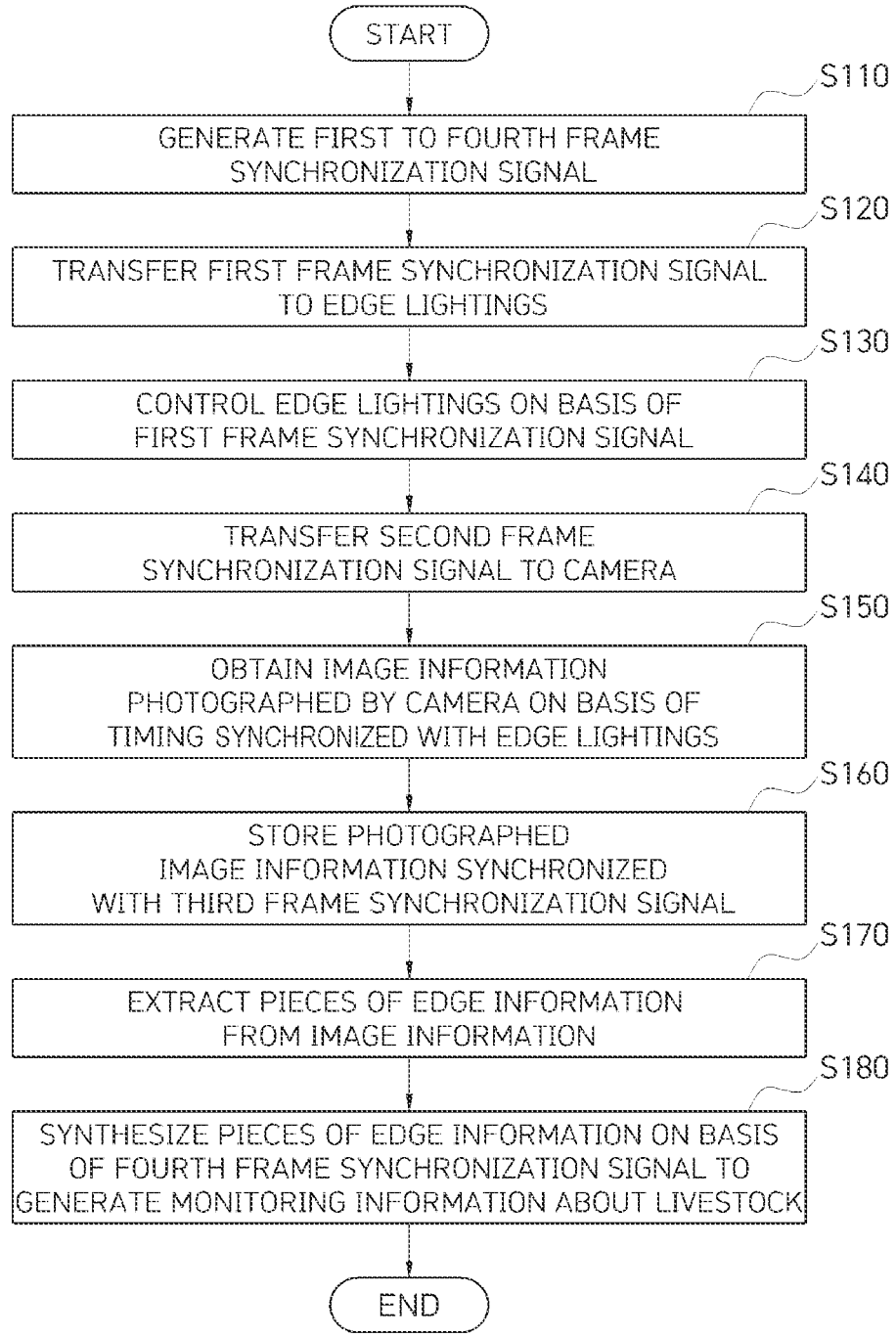

SYSTEM AND METHOD OF MONITORING IN-PEN LIVESTOCK BY USING EDGE INFORMATION ABOUT LIVESTOCK

CROSS-REFERENCE TO RELATED APPLICATIONS

This application claims priority under 35 U.S.C. § 119 to Korean Patent Application No. 10-2020-0102091, filed on Aug. 13, 2020, the disclosure of which is incorporated herein by reference in its entirety.

TECHNICAL FIELD

The present invention relates to a system and method of monitoring in-pen livestock by using edge information about livestock.

BACKGROUND

As livestock industry has been modernized and enlarged, livestock industry has been greatly developed. However, as agricultural society is aging, productivity is reduced, and disease occurs due to enterprise type congested breeding. In order to solve such various problems which occur newly, various changes are needed.

Recently, closed-circuit televisions (CCTVs) are being used for remotely monitoring states of domestic animals which are bred in livestock farm. For example, there is a case where mobile CCTVs using wires are installed in livestock farm, but in this case, cameras may be damaged due to position imbalance or a wire-caught phenomenon when a CCTV is being moved.

Therefore, it is required to develop a smart livestock monitoring system which may automatically determine and continuously photograph and recognize specific domestic animals (for example, cows or pigs which are imminent in calving.) which are to be monitored, without the damage of cameras, and may take an appropriate measure when an emergency situation occurs, in livestock farm.

SUMMARY

Accordingly, the present invention provides a system and method of monitoring in-pen livestock by using edge information about livestock, which control a plurality of edge lightings and cameras installed in a pen by using a synchronization signal and accurately acquire and synthesize edge information about livestock obtained on the basis of a control result to generate monitoring information about livestock.

A method of monitoring in-pen livestock on the basis of edge information about livestock by using a computer, according to a first aspect of the present invention, includes: generating first to third frame synchronization signals synchronized by using a frame synchronization signal generator; transferring the first frame synchronization signal to a plurality of edge lightings which are installed in a certain space and emit light toward livestock bred in a pen; controlling the plurality of edge lightings on the basis of the first frame synchronization signal; transferring the second frame synchronization signal to a camera installed in a specific region of the certain space; obtaining image information photographed by the camera on the basis of a timing synchronized with the plurality of edge lightings according to the second frame synchronization signal; storing the photographed image information synchronized with the third frame synchronization signal; extracting a plurality of edge information about at least one domestic animal, corresponding to the edge lighting, from the image information on the basis of the third frame synchronization signal; and synthesizing the extracted plurality of edge information about the at least one domestic animal to generate monitoring information about the at least one domestic animal.

In some embodiments of the present invention, the controlling of the plurality of edge lightings may include controlling turn-on or off of at least one of the plurality of edge lightings installed in the specific region of the certain space on the basis of the first frame synchronization signal.

In some embodiments of the present invention, each of the plurality of edge lightings may be a light emitting device having an infrared spectrum band.

In some embodiments of the present invention, the storing of the photographed image information may include combining and storing frame synchronization sequence numbers for each frame image data of the photographed image information on the basis of the third frame synchronization signal.

In some embodiments of the present invention, the extracting of the plurality of edge information may include extracting the plurality of edge information about the at least one domestic animal from the frame synchronization sequence number and the frame image data on the basis of the third frame synchronization signal.

In some embodiments of the present invention, the method may further include generating a fourth frame synchronization signal synchronized with the first to third frame synchronization signals by using the frame synchronization signal generator, wherein the synthesizing of the extracted plurality of edge information may include synthesizing pieces of edge information included in the plurality of frame image data on the basis of the fourth frame synchronization signal to generate the monitoring information about the at least one domestic animal.

In some embodiments of the present invention, the extracted plurality of edge information about the at least one domestic animal and the fourth frame synchronization signal may be stored in an edge image frame storage buffer.

In some embodiments of the present invention, the generating of the monitoring information may include sequentially synthesizing pieces of edge information included in the plurality of frame image data to generate the monitoring information about the at least one domestic animal.

In some embodiments of the present invention, the generating of the monitoring information may include selecting pieces of edge information, included in two or more pieces of frame image data, from among the plurality of frame image data and non-sequentially synthesizing the selected pieces of edge information to generate the monitoring information about the at least one domestic animal.

A method of monitoring in-pen livestock on the basis of edge information about livestock by using a computer, according to a second aspect of the present invention, includes: generating first to fourth frame synchronization signals synchronized by using a frame synchronization signal generator; transferring the first frame synchronization signal to a plurality of edge lightings which are installed in a certain space and emit light toward livestock bred in a pen; controlling the plurality of edge lightings on the basis of the first frame synchronization signal; transferring the second frame synchronization signal to a camera installed in a specific region of the certain space; obtaining image information photographed by the camera on the basis of a timing synchronized with the plurality of edge lightings according to the second frame synchronization signal; storing the photographed image information synchronized with the third frame synchronization signal; extracting a plurality of edge information about at least one domestic animal, corresponding to the edge lighting, from the image information on the basis of the third frame synchronization signal; and synthesizing the extracted plurality of edge information about the at least one domestic animal on the basis of the fourth frame synchronization signal to generate monitoring information about the at least one domestic animal.

A system for monitoring in-pen livestock by using edge information about livestock, according to a second aspect of the present invention, includes: a communication module configured to transmit or receive data to or from a plurality of edge lightings, installed in a certain space to emit light toward livestock bred in a pen, and a camera installed in a specific region of the certain space; a memory configured to store a program for controlling the plurality of edge lightings and the camera to generate monitoring information about the livestock; and a processor configured to execute the program stored in the memory, wherein, by executing the program, the processor generates first to third frame synchronization signals synchronized, controls the plurality of edge lightings on the basis of the first frame synchronization signal, obtains image information photographed by the camera on the basis of a timing synchronized with the plurality of edge lightings according to the second frame synchronization signal, synchronizes the photographed image information with the third frame synchronization signal to store the synchronized image information, extracts a plurality of edge information about at least one domestic animal, corresponding to the edge lighting, from the image information on the basis of the third frame synchronization signal, and synthesizes the extracted plurality of edge information to generate the monitoring information about the livestock.

In some embodiments of the present invention, the processor may control turn-on or off of at least one of the plurality of edge lightings installed in the specific region of the certain space on the basis of the first frame synchronization signal.

In some embodiments of the present invention, each of the plurality of edge lightings may be a light emitting device having an infrared spectrum band.

In some embodiments of the present invention, the processor may combine and store frame synchronization sequence numbers for each frame image data of the photographed image information on the basis of the third frame synchronization signal.

In some embodiments of the present invention, the processor may extract the plurality of edge information about the at least one domestic animal on the basis of the frame synchronization sequence number and the frame image data according to the third frame synchronization signal.

In some embodiments of the present invention, the processor may generate a fourth frame synchronization signal synchronized with the first to third frame synchronization signals and may synthesize the plurality of frame-based edge information on the basis of the fourth frame synchronization signal to generate the monitoring information about the livestock.

In some embodiments of the present invention, the extracted plurality of edge information about the at least one domestic animal and the fourth frame synchronization signal may be stored in an edge image frame storage buffer.

In some embodiments of the present invention, the processor may sequentially synthesize the plurality of frame-based edge information to generate the monitoring information about the livestock.

In some embodiments of the present invention, the processor may select two or more pieces of edge information from among the plurality of frame-based edge information and may non-sequentially synthesize the selected two or more pieces of edge information to generate the monitoring information about the livestock.

Furthermore, another method, another system, and a computer-readable recording medium storing a computer program for executing the other method may be further provided for implementing the present invention.

Other features and aspects will be apparent from the following detailed description, the drawings, and the claims.

BRIEF DESCRIPTION OF THE DRAWINGS

FIG. 7 is a flowchart of a method of monitoring in-pen livestock by using edge information about livestock, according to an embodiment of the present invention.

DETAILED DESCRIPTION OF EMBODIMENTS

Figure 1:
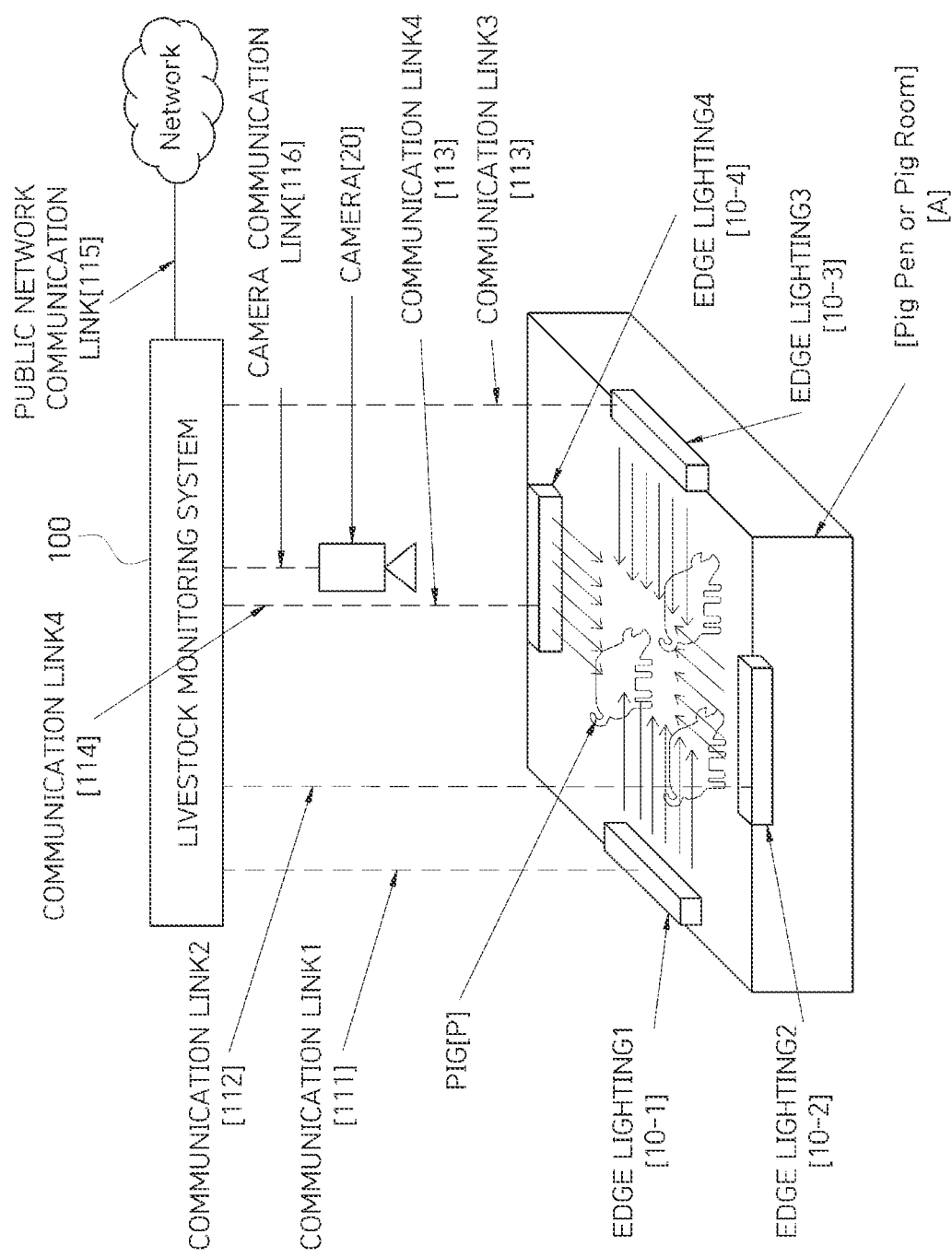
FIG. 1 is a diagram for describing a livestock monitoring system according to an embodiment of the present invention.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In the drawings, like reference numerals refer to like elements. As used herein, the term "and/or" includes any and all combinations of one or more of the associated listed items. It will be understood that, although the terms first, second, etc. used herein may qualify various elements according to various embodiments, these elements should not be limited by these terms. For example, the terms do not limit the order and/or importance of corresponding elements. These terms are only used to distinguish one element from another. For example, a first element could be termed a second element, and similarly, a second element could be termed a first element, without departing from the scope of the present invention.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention relates to a system 100 and method of monitoring in-pen livestock by using edge information about livestock.

In conventional livestock monitoring technology, for example, an image obtainment sensor such as a camera is installed at a ceiling or a side surface of each of pig pens or pig rooms, and image information about states or actions or postures of pigs is obtained through photographing performed with respect to a top view or a side surface.

Such conventional technology is much affected by a peripheral lighting environment in obtaining image information through a camera. For example, a light exposure environment (intensity, a wavelength, and a duration of light) in a pen are changed based on a breeding period of each pig and an environment of livestock farm, and a changed light exposure environment greatly affects the quality of obtained image information.

Moreover, edge information which is contour information about an object to be analyzed is information which is very significant for checking a shape of livestock and deducing a size of livestock. However, there is a problem where edge information about livestock is blurredly obtained based on a resolution of a camera system, a lighting environment, and a crowding action of in-pen livestock.

Image processing or artificial intelligence processing based on blurred edge information causes many problems in accuracy of livestock recognition.

On the other hand, according to an embodiment of the present invention, a camera 20 and a plurality of edge lightings 10 installed to emit light toward in-pen livestock may be synchronized and may operate to obtain edge information, thereby solving a problem, where a blurred edge image is captured, of the related art.

Hereinafter, a system 100 of monitoring in-pen livestock (hereinafter referred to as a livestock monitoring system) by using edge information about livestock according to an embodiment of the present invention will be described with reference to FIGS. 1 to 6.

In an embodiment of the present invention, target livestock is not limited to pig, chicken, cattle, etc., and for convenience of description, an example where corresponding livestock is pig will be described below.

Figure 2:
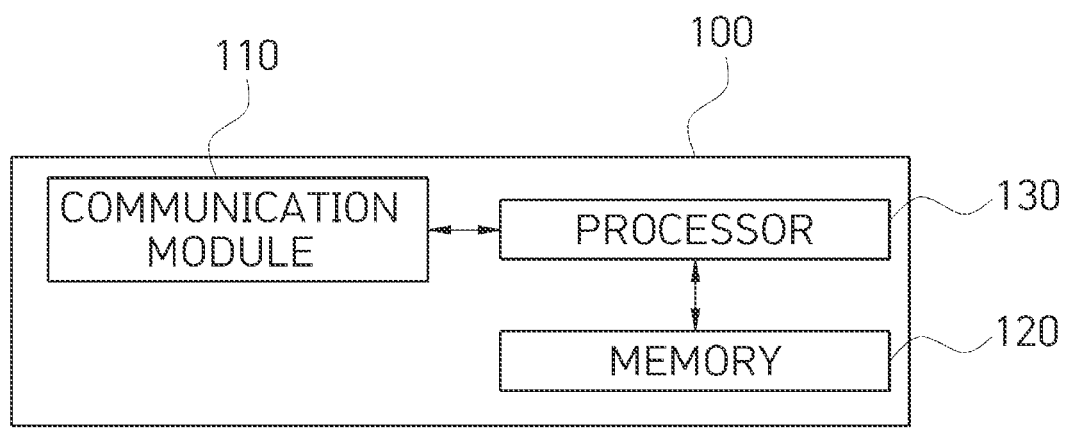
FIG. 2 is a block diagram of a livestock monitoring system according to an embodiment of the present invention.

FIG. 1 is a diagram for describing a livestock monitoring system 100 according to an embodiment of the present invention. FIG. 2 is a block diagram of a livestock monitoring system 100 according to an embodiment of the present invention.

The livestock monitoring system 100 according to an embodiment of the present invention may include a communication module 110, a memory 120, and a processor 130.

The communication module 110 may transmit or receive data to or from the plurality of edge lightings 10 and the camera 20.

The plurality of edge lightings 10 may be installed in a certain space of a pen and may emit light toward livestock. For example, as illustrated in FIG. 1, the plurality of edge lightings 10 may be installed to be respectively attached on side surfaces of a pig pen or a pig room, where a plurality of pigs are bred.

In an embodiment, the plurality of edge lightings 10 may be paired and installed at opposite positions in the pen. That is, when one of the plurality of edge lightings 10 emits light toward a first surface of the certain space of the pen, a lighting paired therewith may emit light toward a second surface facing the first surface. Also, other lightings may be respectively installed on a third surface and a fourth surface, which are vertical to the first surface and the second surface.

The plurality of edge lightings 10 may use a spectrum of light which adversely affects the growth and period of livestock. For example, a visual receptor of a pig may not sense a red spectrum of 650 nm or more, the plurality of edge lightings 10 may use a light emitting device having an infrared spectrum band.

The camera 20 may be installed in a specific region of the certain space and may photograph livestock which is bred in the pen. In this case, according to an embodiment of the present invention, the camera 20 may perform photographing at a timing at which the camera 20 is synchronized with the plurality of edge lightings 10.

The plurality of edge lightings 10 and the camera 20 may transmit or receive data to or from the communication module 110, and for example, the plurality of edge lightings 10 may be connected to the camera 20 through a plurality of communication links 111 to 116.

The communication module 110 may include all of a wired communication module and a wireless communication module. For example, the wired communication module may be implemented with a power cable communication device, a telephone cable communication device, a cable home (MoCA), Ethernet, IEEE1294, an integrated wired home network, and/or an RS-485 control device. Also, the wireless communication module may be implemented with wireless local area network (WLAN), Bluetooth, high data rate wireless personal area network (HDR WPAN), ultra-wide band (UWB), Zigbee, impulse radio, 60 GHz WPAN, binary-code division multiple access (CDMA), wireless universal serial bus (USB) technology, and/or wireless high definition media interface (HDMI) technology.

A program for controlling the plurality of edge lightings 10 and the camera 20 to generate monitoring information about livestock may be stored in the memory 120, and the processor 130 may execute the program stored in the memory 120.

Moreover, the memory 120 may include a volatile storage device and a non-volatile storage device which continuously maintains information stored therein even when power is not supplied thereto. The memory 120 may include NAND flash memory such as compact flash (CF) card, secure digital (SD) card, memory stick, solid state drive (SSD), and micro SD card, a magnetic computer memory device such as hard disk drive (HDD), and optical disc drive such as compact disc-read only memory (CD-ROM) and digital versatile disc-read only memory (DVD-ROM).

The processor 130 may execute the program stored in the memory 120 to generate first to third frame synchronization signals synchronized with one another.

In detail, the processor 130 may generate the first frame synchronization signal, transfer the first frame synchronization signal to the plurality of edge lightings 10 which emit light toward the livestock bred in the pen, and control the turn-on/off of the plurality of edge lightings 10 on the basis of the first frame synchronization signal. At this time, the processor 130 may control each of the plurality of edge lightings 10 or may combine and control the plurality of edge lightings 10.

Subsequently, the processor 130 may transfer the second frame synchronization signal to the camera 20 installed in a specific region of the certain space and may obtain image information photographed by the camera 20 on the basis of a timing synchronized with the plurality of edge lightings 20 according to the second frame synchronization signal.

Subsequently, the processor 130 may synchronize the photographed image information with the third frame synchronization signal and may store synchronized image information. In this case, the image information photographed by the camera 20 may be transferred to the memory 120 through a communication link connected to the camera 20 and may be stored in a frame storage space of the memory 120.

Figure 3:
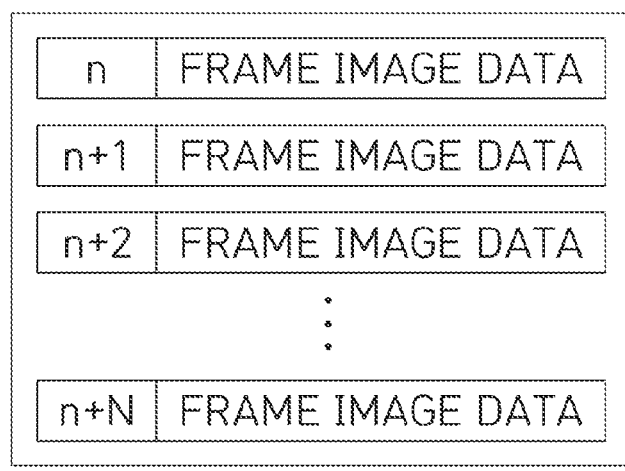
FIG. 3 is a diagram illustrating an embodiment of data stored in a frame storage space.

FIG. 3 is a diagram illustrating an embodiment of data stored in a frame storage space.

As illustrated in FIG. 3, the processor 130 may combine and store frame synchronization sequence numbers for each frame image data of photographed image information on the basis of the third frame synchronization signal.

For example, the processor 130 may combine Nos. n, n+1, . . . , n+N frame synchronization sequence numbers in association with total N number of pieces of frame image data and may store a combined frame synchronization sequence number in a frame storage space. Based on the frame synchronization sequence number, the processor 130 may synthesize a plurality of frame-based edge information.

Subsequently, the processor 130 may extract a plurality of edge information about at least one domestic animal, corresponding to the edge lighting 10, from image information on the basis of the third frame synchronization signal.

That is, the processor 130 may extract edge information about livestock according to the third frame synchronization signal on the basis of the frame synchronization sequence and the frame image data stored in the frame storage space.

When the edge information is extracted, the processor 130 may synthesize a plurality of extracted edge information about the livestock to generate monitoring information about the livestock, and the generated monitoring information about the livestock may be transmitted to a user terminal through a communication module on the basis of a request of a user.

At this time, the processor 130 may generate a fourth frame synchronization signal synchronized with the first to third frame synchronization signals and may store the fourth frame synchronization signal and edge information in an edge image frame storage buffer of the memory 120. Also, the processor 130 may synthesize edge information stored in the edge image frame storage buffer on the basis of the fourth frame synchronization signal to generate the monitoring information about the livestock.

Figure 4:
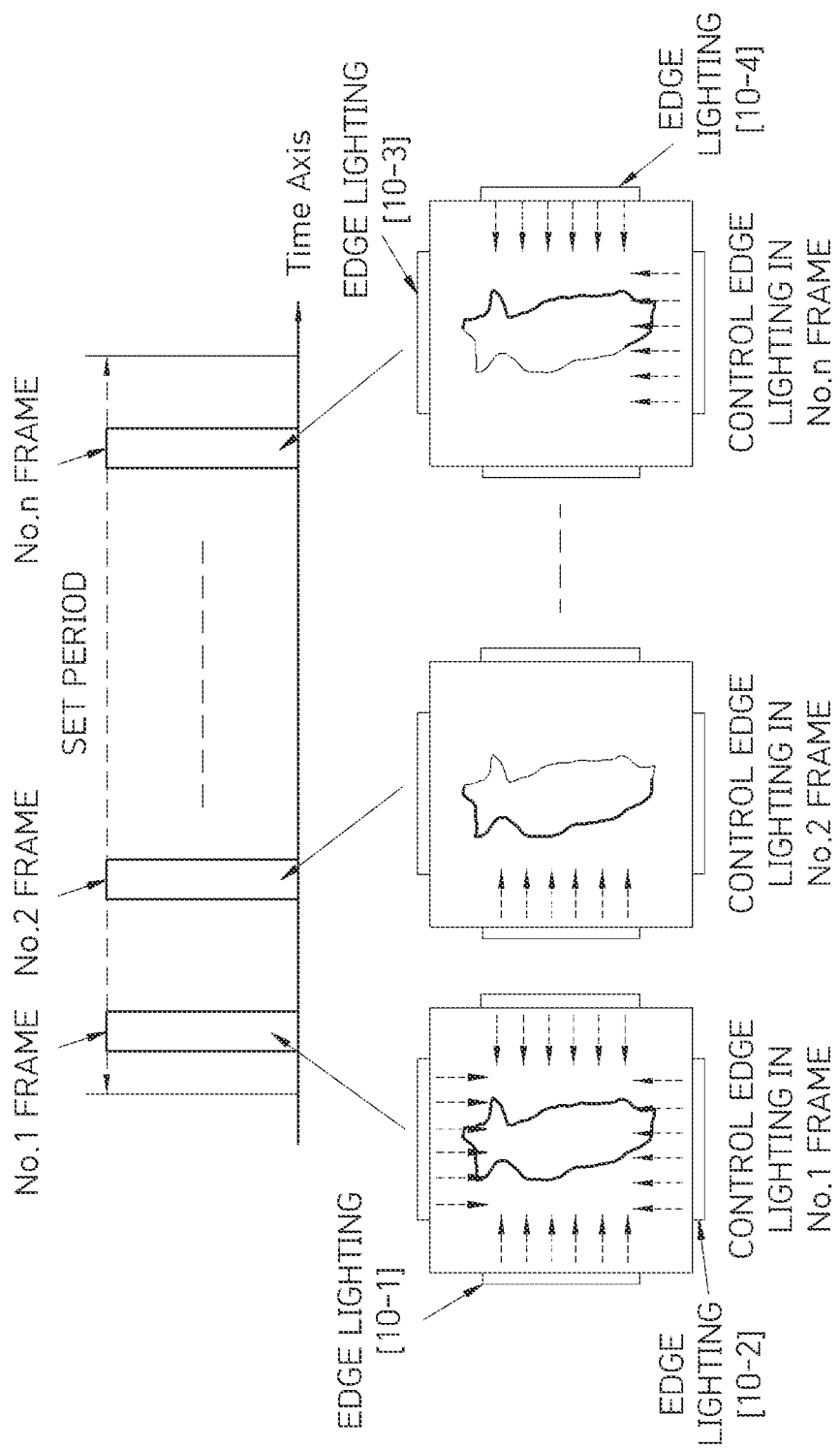
FIG. 4 is a diagram illustrating an embodiment which obtains edge information on the basis of a frame synchronization signal.

FIG. 4 is a diagram illustrating an embodiment which obtains edge information on the basis of a frame synchronization signal.

A plurality of edge information may be extracted from N number of frame image data included in a predetermined period by a user.

In FIG. 4, first edge information may be obtained from first frame image data. As the plurality of edge lightings 10 are turned on, the edge lightings 10 may irradiate light onto four surfaces of the livestock, and the camera 20 may photograph the livestock, thereby obtaining the first frame image data.

On the other hand, second edge information may be obtained from second frame image data. As only one left edge lighting of the plurality of edge lightings 10 is turned on, the edge lighting 10 may irradiate light onto only a left surface of the livestock, and the camera 20 may photograph the livestock, thereby obtaining the second frame image data. In the second edge information, unlike the first edge information, light may be irradiated in one direction, a characteristic of edge information about a direction opposite to a direction in which light is directly irradiated may be greatly changed, and the camera 20 may obtain frame image data where a characteristic of edge information is large.

Figure 5:
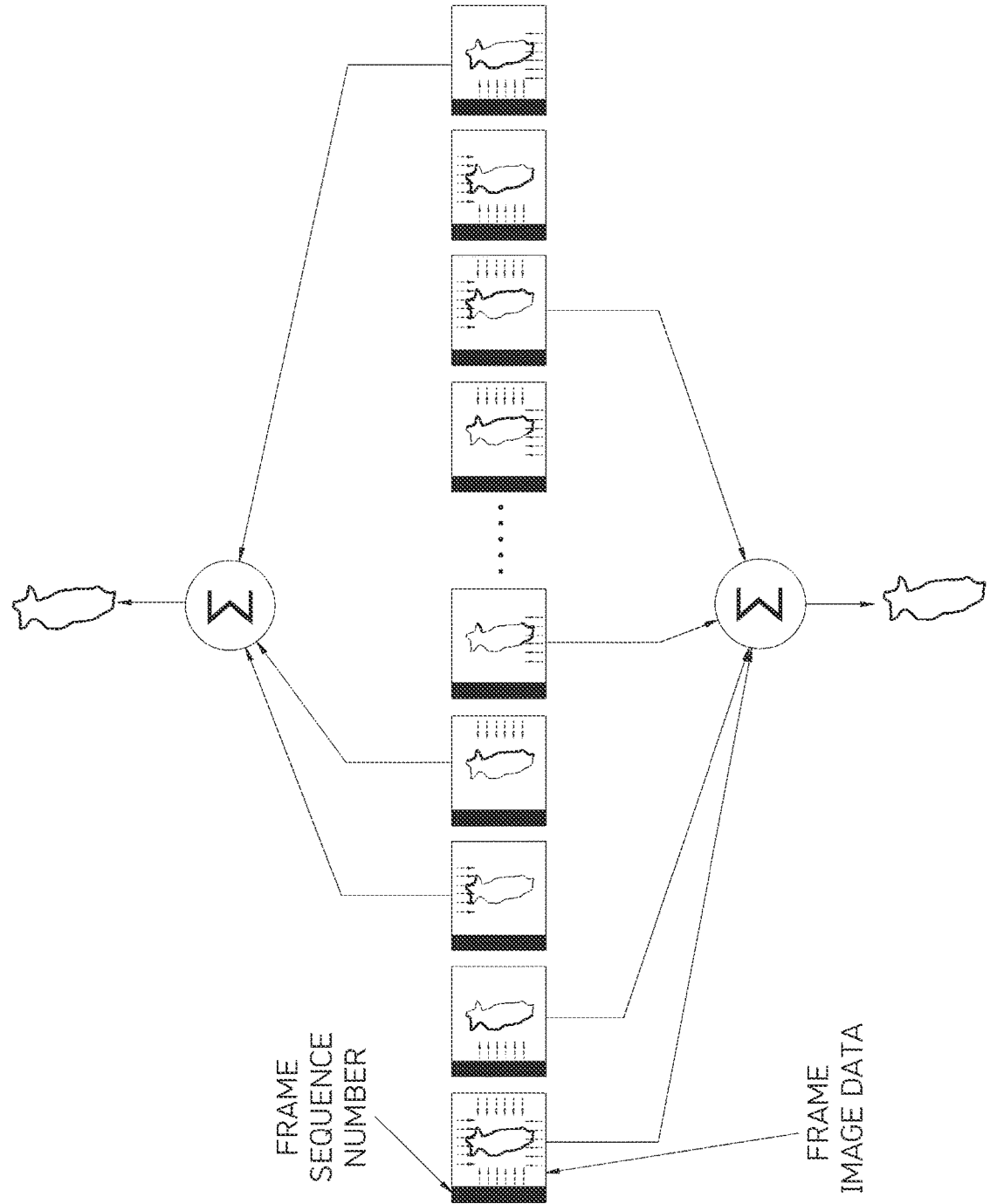
FIG. 5 is a diagram illustrating an embodiment which synthesizes a plurality of edge information.

FIG. 5 is a diagram illustrating an embodiment which synthesizes a plurality of edge information.

The processor 130 may sequentially synthesize edge information included in a plurality of frame image data to generate monitoring information about livestock.

That is, in FIG. 5, the processor 130 may sequentially synthesize $n^{th}$ to $n+N^{th}$ frame image data to generate the monitoring information about the livestock.

On the other hand, the processor 130 may select edge information, included in two or more pieces of frame image data, from among a plurality of frame image data and may non-sequentially synthesize the selected edge information to generate the monitoring information about the livestock.

That is, in FIG. 5, the processor 130 may select $n^{th}$, $n+1^{th}$, $n+4^{th}$, and $n+8^{th}$ frame image data from among the plurality of frame image data and may synthesize edge information included in the frame image data on the basis of the third frame synchronization signal to generate the monitoring information about the livestock.

Monitoring information about livestock, where an edge portion is clear, may be obtained based on synthesis of a plurality of edge information.

Figure 6:
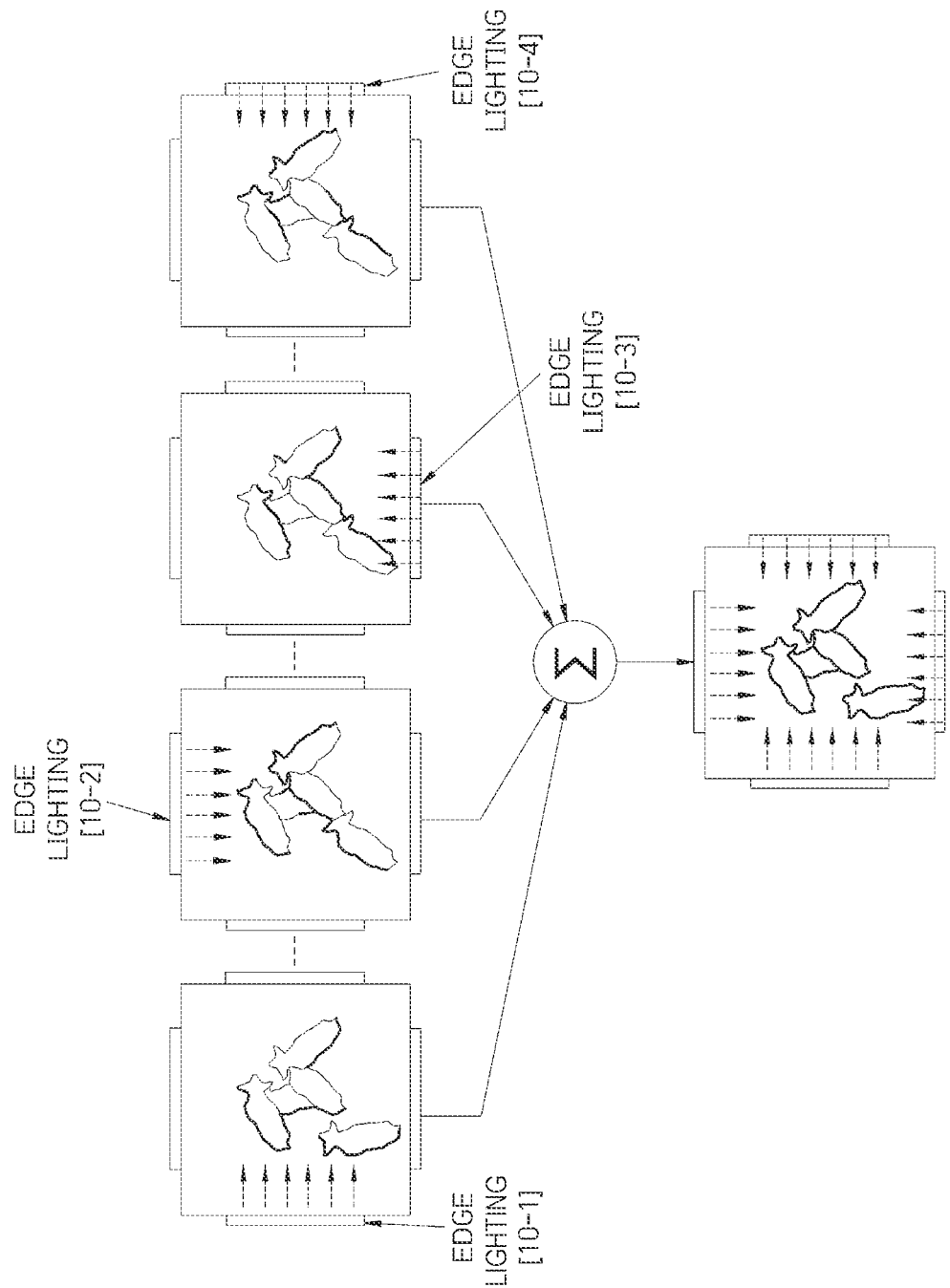
FIG. 6 is a diagram illustrating an embodiment which synthesizes pieces of edge information with respect of a plurality of domestic animals.

FIG. 6 is a diagram illustrating an embodiment which synthesizes pieces of edge information with respect of a plurality of domestic animals.

Because it is not that only one domestic animal is in a certain space where livestock is bred, monitoring information about livestock may be obtained from a plurality of domestic animals.

In this case, in an embodiment of the present invention, a plurality of edge information may be obtained based on frame image data which is obtained by simultaneously or individually controlling the plurality of edge lightings 10, and based on the edge information obtained in this manner, monitoring information about a plurality of domestic animals may be obtained.

In an embodiment, as in FIG. 6, the present invention may obtain monitoring information about each of a plurality of domestic animals despite an environment where the plurality of domestic animals overlap. That is, the processor 130 may obtain information about the number of domestic animals on the basis of previously information about the number of domestic animals or sensing information obtained through the camera 20 or a separate sensor and may compare sensed or input information about the number of domestic animals with information about the number of domestic animals obtained based on synthesis of pieces of edge information to determine whether synthesis of pieces of edge information is completed on all domestic animals.

When monitoring information about all domestic animals is obtained as a determination result, the processor 130 may end the control of the edge lighting 10 and the camera 20 and may provide obtained monitoring information to a user terminal.

On the other hand, when pieces of monitoring information about some domestic animals are omitted, frame image data may be obtained by controlling the edge lighting 10 and the camera 20 until monitoring information corresponding to the number of all domestic animals is obtained, and edge information may be extracted and synthesized.

Herewith or additionally, the processor 130 may additionally perform a process of reducing complexity in obtaining pieces of monitoring information about a plurality of domestic animals. That is, when processor 130 synthesizes a plurality of edge information on the basis of the number of domestic animals previously input or sensing information about livestock obtained through the camera 20 or a separate sensor to complete generating of monitoring information about first livestock, the processor 130 may remove frame image data matching the first livestock.

Moreover, the processor 130 may synthesize pieces of edge information on the basis of remaining frame image data to generate monitoring information about second livestock.

In generating pieces of monitoring information about a plurality of domestic animals on the basis of such a process, the processor 130 may progressively decrease the number of operations performed on data and may more quickly extract and synthesize pieces of edge information.

Hereinafter, a method of monitoring, by the livestock monitoring system 100, in-pen livestock by using edge information about livestock will be described with reference to FIG. 7.

FIG. 7 is a flowchart of a method of monitoring in-pen livestock by using edge information about livestock, according to an embodiment of the present invention.

First, a method performed by the livestock monitoring system 100 may generate first to fourth frame synchronization signals synchronized by a frame synchronization signal generator in step S110.

Subsequently, the first frame synchronization signal may be transferred to the plurality of edge lightings 10 which are installed in a certain space and emit light toward livestock bred in a pen in step S120, and the plurality of edge lightings 10 may be controlled based on the first frame synchronization signal in step S130.

Subsequently, the second frame synchronization signal may be transferred to the camera 20 installed in a specific region of a certain space in step S140, and image information photographed by the camera 20 may be obtained based on a timing synchronized with the plurality of edge lightings 10 according to the second frame synchronization signal in step S150.

Subsequently, the photographed image information may be synchronized with the third frame synchronization signal and may be stored in step S160, a plurality of edge information about at least one domestic animal corresponding to the edge lighting 10 may be extracted from image information on the basis of the third frame synchronization signal in step S170, and a plurality of edge information about livestock extracted based on the fourth frame synchronization signal may be synthesized to generate monitoring information about livestock in step S180.

In the above description, steps S110 to S180 may be further divided into additional steps, or may be combined into fewer steps. Also, depending on the case, some steps may be omitted, and the order of steps may be changed.

Despite other omitted descriptions, descriptions given with reference to FIGS. 1 to 6 may be applied to the method of monitoring in-pen livestock by using edge information about livestock illustrated in FIG. 7.

The method of monitoring in-pen livestock by using edge information about livestock according to an embodiment of the present invention may be implemented as a program (or an application) and may be stored in a medium, so as to be executed in connection with a server which is hardware.

The above-described program may include a code encoded as a computer language such as C, C++, JAVA, or machine language readable by a processor (CPU) of a computer through a device interface of the computer, so that the computer reads the program and executes the methods implemented as the program. Such a code may include a functional code associated with a function defining functions needed for executing the methods, and moreover, may include an execution procedure-related control code needed for executing the functions by using the processor of the computer on the basis of a predetermined procedure. Also, the code may further include additional information, needed for executing the functions by using the processor of the computer, or a memory reference-related code corresponding to a location (an address) of an internal or external memory of the computer, which is to be referred to by a media. Also, when the processor needs communication with a remote computer or server so as to execute the functions, the code may further include a communication-related code corresponding to a communication scheme needed for communication with the remote computer or server and information or a media to be transmitted or received in performing communication, by using a communication module of the computer.

The stored medium may denote a device-readable medium semi-permanently storing data, instead of a medium storing data for a short moment like a register, a cache, and a memory. In detail, examples of the stored medium may include read only memory (ROM), random access memory (RAM), CD-ROM, a magnetic tape, floppy disk, and an optical data storage device, but are not limited thereto. That is, the program may be stored in various recording mediums of various servers accessible by the computer or various recording mediums of the computer of a user. Also, the medium may be distributed to computer systems connected to one another over a network and may store a code readable by a computer in a distributed scheme.

Operations of an algorithm or a method described above according to the embodiments of the present invention may be directly implemented as hardware, implemented as a software module executed by hardware, or implemented by a combination thereof. The software module may be provided in RAM, ROM, erasable programmable read only memory (EPROM), electrical erasable programmable read only memory (EEPROM), flash memory, a hard disk, an attachable/detachable disk, and CD-ROM, or a computer-readable recording medium of an arbitrary type well known to those skilled in the art.

According to the embodiments of the present invention, a camera and a plurality of edge lightings installed to emit light toward in-pen livestock may be synchronized and may operate to obtain edge information, thereby solving a problem, where a blurred edge image is captured, of the related art.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of monitoring in-pen livestock on the basis of edge information about livestock by using a computer, the method comprising:
generating first to third frame synchronization signals synchronized by using a frame synchronization signal generator;
transferring the first frame synchronization signal to a plurality of edge lightings which are installed in a certain space and emit light toward livestock bred in a pen;
controlling the plurality of edge lightings on the basis of the first frame synchronization signal;
transferring the second frame synchronization signal to a camera installed in a specific region of the certain space;
obtaining image information photographed by the camera on the basis of a timing synchronized with the plurality of edge lightings according to the second frame synchronization signal;
storing the photographed image information synchronized with the third frame synchronization signal;
extracting a plurality of edge information about at least one domestic animal, corresponding to the edge lighting, from the image information on the basis of the third frame synchronization signal; and
synthesizing the extracted plurality of edge information about the at least one domestic animal to generate monitoring information about the at least one domestic animal.

2. The method of claim 1, wherein the controlling of the plurality of edge lightings comprises controlling turn-on or off of at least one of the plurality of edge lightings installed in the specific region of the certain space on the basis of the first frame synchronization signal.

3. The method of claim 1, wherein each of the plurality of edge lightings is a light emitting device having an infrared spectrum band.

4. The method of claim 1, wherein the storing of the photographed image information comprises combining and storing frame synchronization sequence numbers for each frame image data of the photographed image information on the basis of the third frame synchronization signal.

5. The method of claim 4, wherein the extracting of the plurality of edge information comprises extracting the plurality of edge information about the at least one domestic animal from the frame synchronization sequence number and the frame image data on the basis of the third frame synchronization signal.

6. The method of claim 1, further comprising generating a fourth frame synchronization signal synchronized with the first to third frame synchronization signals by using the frame synchronization signal generator,
wherein the synthesizing of the extracted plurality of edge information comprises synthesizing pieces of edge information included in the plurality of frame image data on the basis of the fourth frame synchronization signal to generate the monitoring information about the at least one domestic animal.

7. The method of claim 6, wherein the extracted plurality of edge information about the at least one domestic animal and the fourth frame synchronization signal are stored in an edge image frame storage buffer.

8. The method of claim 6, wherein the generating of the monitoring information comprises sequentially synthesizing pieces of edge information included in the plurality of frame image data to generate the monitoring information about the at least one domestic animal.

9. The method of claim 6, wherein the generating of the monitoring information comprises selecting pieces of edge information, included in two or more pieces of frame image data, from among the plurality of frame image data and non-sequentially synthesizing the selected pieces of edge information to generate the monitoring information about the at least one domestic animal.

10. A method of monitoring in-pen livestock on the basis of edge information about livestock by using a computer, the method comprising:
generating first to fourth frame synchronization signals synchronized by using a frame synchronization signal generator;
transferring the first frame synchronization signal to a plurality of edge lightings which are installed in a certain space and emit light toward livestock bred in a pen;
controlling the plurality of edge lightings on the basis of the first frame synchronization signal;
transferring the second frame synchronization signal to a camera installed in a specific region of the certain space;
obtaining image information photographed by the camera on the basis of a timing synchronized with the plurality of edge lightings according to the second frame synchronization signal;
storing the photographed image information synchronized with the third frame synchronization signal;
extracting a plurality of edge information about at least one domestic animal, corresponding to the edge lighting, from the image information on the basis of the third frame synchronization signal; and
synthesizing the extracted plurality of edge information about the at least one domestic animal on the basis of the fourth frame synchronization signal to generate monitoring information about the at least one domestic animal.

11. A system for monitoring in-pen livestock by using edge information about livestock, the system comprising:
a communication module configured to transmit or receive data to or from a plurality of edge lightings, installed in a certain space to emit light toward livestock bred in a pen, and a camera installed in a specific region of the certain space;
a memory configured to store a program for controlling the plurality of edge lightings and the camera to generate monitoring information about the livestock; and
a processor configured to execute the program stored in the memory,
wherein, by executing the program, the processor generates first to third frame synchronization signals synchronized, controls the plurality of edge lightings on the basis of the first frame synchronization signal, obtains image information photographed by the camera on the basis of a timing synchronized with the plurality of edge lightings according to the second frame synchronization signal, synchronizes the photographed image information with the third frame synchronization signal to store the synchronized image information, extracts a plurality of edge information about at least one domestic animal, corresponding to the edge lighting, from the image information on the basis of the third frame synchronization signal, and synthesizes the extracted plurality of edge information to generate the monitoring information about the livestock.

12. The system of claim 11, wherein the processor controls turn-on or off of at least one of the plurality of edge lightings installed in the specific region of the certain space on the basis of the first frame synchronization signal.

13. The system of claim 11, wherein each of the plurality of edge lightings is a light emitting device having an infrared spectrum band.

14. The system of claim 11, wherein the processor combines and stores frame synchronization sequence numbers for each frame image data of the photographed image information on the basis of the third frame synchronization signal.

15. The system of claim 14, wherein the processor extracts the plurality of edge information about the at least one domestic animal on the basis of the frame synchronization sequence number and the frame image data according to the third frame synchronization signal.

16. The system of claim 11, wherein the processor generates a fourth frame synchronization signal synchronized with the first to third frame synchronization signals and synthesizes the plurality of frame-based edge information on the basis of the fourth frame synchronization signal to generate the monitoring information about the livestock.

17. The system of claim 16, wherein the extracted plurality of edge information about the at least one domestic animal and the fourth frame synchronization signal are stored in an edge image frame storage buffer.

18. The system of claim 16, wherein the processor sequentially synthesizes the plurality of frame-based edge information to generate the monitoring information about the livestock.

19. The system of claim 16, wherein the processor selects two or more pieces of edge information from among the plurality of frame-based edge information and non-sequentially synthesizes the selected two or more pieces of edge information to generate the monitoring information about the livestock.

* * * * *